United States Patent
Menzel et al.

(10) Patent No.: US 9,356,742 B2
(45) Date of Patent: May 31, 2016

(54) METHOD AND SYSTEM FOR TRANSMITTING DATA IN A MOTOR VEHICLE

(75) Inventors: Marc Menzel, Weimar (DE); Ulrich Staehlin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/129,002

(22) PCT Filed: Mar. 30, 2012

(86) PCT No.: PCT/EP2012/055784
§ 371 (c)(1),
(2), (4) Date: Dec. 23, 2013

(87) PCT Pub. No.: WO2013/000594
PCT Pub. Date: Jan. 3, 2013

(65) Prior Publication Data
US 2014/0140374 A1 May 22, 2014

(30) Foreign Application Priority Data

Jun. 30, 2011 (DE) .................. 10 2011 110 968

(51) Int. Cl.
H04B 1/00 (2006.01)
H04L 1/22 (2006.01)
H04L 12/707 (2013.01)
H04L 1/00 (2006.01)
H04L 1/06 (2006.01)
H04L 1/08 (2006.01)
H04B 1/7163 (2011.01)

(52) U.S. Cl.
CPC .............. *H04L 1/22* (2013.01); *H04B 1/71632* (2013.01); *H04L 1/0041* (2013.01); *H04L 1/06* (2013.01); *H04L 1/08* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 6,185,258 B1 | 2/2001 | Alamouti et al. | |
| 2006/0253726 A1 | 11/2006 | Kukshya et al. | |
| 2010/0148940 A1* | 6/2010 | Gelvin et al. | 340/286.02 |
| 2012/0219039 A1* | 8/2012 | Feher | 375/219 |

FOREIGN PATENT DOCUMENTS

WO   WO 2012/016756   2/2012

OTHER PUBLICATIONS

Lee et al.—Path Switching—A Quasi-Static Routing Scheme for Large-Scale ATM Packet Switches ; IEEE Journal on Selected Areas in Communications, vol. 15, No. 5, Jun. 1997, pp. 914-924.*
Gustafsson et al., "A Literature Survey on Traffic Dispersion", Mar. 1, 1997, pp. 1-9.
Yeung, et al, "Network coding Theory", Jan. 1, 2005, pp. 241-381.
Wikipedia, "Ultra-wideband" Jan. 6, 2011 (6 pages).
Wikipedia, "Rake Receiver", Apr. 4, 2011 (2 pages).

* cited by examiner

*Primary Examiner* — Adolf Dsouza
(74) *Attorney, Agent, or Firm* — Cozen O'Connor

(57) ABSTRACT

A method and a system are provided for transmitting data in a motor vehicle by wireless communication. The data from a first transmitting data node is divided, transmitted to a second receiving data node via at least two different communication routes, and reassembled upon being received. Redundant data is generated from the data to be transmitted, the redundant data allowing a reconstruction of the data to be transmitted in the event that a communication route fails. The redundant data and the data to be transmitted are transmitted via the different communication routes.

7 Claims, 2 Drawing Sheets

METHOD AND SYSTEM FOR TRANSMITTING DATA IN A MOTOR VEHICLE

CROSS-REFERENCE TO RELATED APPLICATIONS

This is a U.S. national stage of application No. PCT/EP2012/055784, filed on 30 Mar. 2012, which claims priority to the German Application No. 10 2011 110 968.8, filed Jun. 2011, the content of both incorporated herein by reference.

BACKGROUND OF THE INVENTION

1. Field of the Invention

The invention relates to a method and to a system for transmitting data in a motor vehicle by wireless communication, in which the data from a first transmitting data node are divided and are transmitted via at least two different communication routes to a second receiving data node and are reassembled upon reception.

2. Related Art

Usually, in current vehicles, components are connected to one another almost exclusively by cable since the susceptibility to interference of wireless communication links frequently does not permit reliable communication between the individual components in the vehicle.

Even ultra-wide-band communication (UWB communication), which, due to its great frequency bandwidth is very resistant to interference in the frequency band, as a rule, can not provide sufficiently reliable communication between vehicle components. Here, too, a communication link between two components can be interrupted if, e.g., an interconnecting node fails or a wide-band attenuator, for example in the form of a metal plate, is inserted between two interconnecting nodes. This may happen quite easily since the conditions for wireless communication can change continuously in any vehicle, for example due to different loading.

For this reason, data transmission in motor vehicles is in most cases wire-connected, in which direct connecting lines between the individual components provide for corresponding communication. In some cases, communication bus systems are also used in which the information of the individual components is exchanged via a common bus system. However, such a bus system is expensive to install and maintain since, in most cases, new components must be registered in the bus system. On the other hand, installing individual cable harnesses to all components in each case is expensive and contributes to a distinctly higher vehicle weight due to the copper lines used in most cases. Furthermore, it impairs the subsequent installation of components since cable harnesses can still only be pulled through with great effort after the completion of the vehicle.

DE 600 17 724 T2 describes a known system and method for transmitting data via a number of possible communication paths which have different features. During the data transmission, the features of the possible communication paths are detected and the data flow is divided into at least two of these communication paths on the basis of this information and on an optimization condition given by the user, for example in the form of data packets. In the receiving unit, the data flow transmitted via the different communication paths is joined again. Suitable information items, on the basis of which the data flow is divided, are prices and speed of the communication paths, permitted data packet sizes, transportation time, information items relating to interposed transmitting units and priorities predetermined by the user. In this manner the capacities of the available communication systems are to be better utilized. Correspondingly, the various communication paths to be used are, for example, HSCSD, GPRS, Bluetooth, WLAN or the like.

In spite of the better utilization of capacity of the available communication paths, however, the security of transmission is not improved. In contrast, gaps can occur during the joining of the data from the various data packets which lead to the loss of data. The transmission can not, therefore, be used reliably for security-related data.

SUMMARY OF THE INVENTION

It is the object of the present invention, therefore, to improve the data security in a data transmission by means of wireless transmission paths in the motor vehicle.

In particular, according to one aspect of the invention, it is provided that of data to be transmitted, redundant data are generated which allow a reconstruction of the data to be transmitted in the case of a failure of a communication route. These redundant data and the data possibly also still divided themselves, to be transmitted, are transmitted divided via different communication routes within the motor vehicle.

In the case of a radiocommunication, in one aspect, the simplest communication route is formed by a direct communication between the transmitting data node and the receiving data node. Other communication routes are implemented via intermediate nodes which have the function of a router and receive the data emitted by the transmitting data node and emit them again so that the receiving data node can receive these data. These intermediate nodes can be designed as pure routers with transmitting and receiving parts, which are positioned at various positions of the vehicle. The intermediate nodes having a router function can also have additional functions or be integrated into other vehicle components so that these can have both the function of a transmitting or receiving data node and of a router.

By the fact that the data to be transmitted and the redundant data derived from this are transmitted via at least two different communication routes, it is possible to reconstruct these data reliably in the case of a failure of one communication route. By using a combination of a number of communication routes from the transmitting data node to the receiving data node, the overall connection is resistant against interference on at least one of the communication routes. This also applies to the case where, in the normal case, a direct link exists between the transmitting and the receiving data node since this can be disturbed, for example due to a shielding temporarily introduced during the loading of the vehicle even if this has the advantage that intermediate nodes cannot fail.

Compared with wire-connected communication links, for example wire-connected bus communication, between the individual components of the vehicle, the resultant advantage is that the pulling of cable harnesses can be omitted and new components can be introduced into a radio network, for example as part of ad-hoc networks with current technology. At the same time, the redundancies created according to the invention provide a reliable data transmission.

According to an aspect the invention, the transmission of the (actual) data to be transmitted, i.e. of the desired information, and of the redundant data, can take place especially in real time or in direct temporal vicinity via the various communication routes. The multiple transmission, known especially from unidirectional radiocommunication systems, of communication messages, in stochastically varied time intervals, should preferably not be utilized for redundancy purposes in this case. This is not suitable for communication of components in vehicles in many cases because it requires fast and immediate forwarding of information.

According to a particularly simple embodiment of the method proposed according to the invention, the redundant data can be at least one, but possibly also several copies of the data to be transmitted. These redundant data and the (actual) data to be transmitted are then transmitted via different communication routes in which context, for example, a data record can be allocated to one communication route. A data record then consists of the data to be transmitted or, respectively, of a copy of the data to be transmitted, i.e. the redundant data. In this case, the data to be transmitted and the copy or copies of the data to be transmitted can thus be transmitted in each case completely via their own communication route.

In the case of a total of preferably three communication routes, a dual redundancy can thus be achieved since the data to be transmitted and two copies of the data to be transmitted can be transmitted as dual redundant data. As a result, a particularly great security can be achieved because only one of the three communication routes needs to perform a successful communication so that the desired information is present at the receiving data node. Naturally, this also applies—with other achievable redundancies—for a different number of communication routes. In this embodiment, however, there is no increase in the transmission rate in spite of the use of a number of communication routes for the data transmission. The speed of transmission for the data to be transmitted thus remains the same in spite of an increase of the potentially possible data rate.

In order to achieve a more equal balance between security (degree of redundancy) and speed (degree of transmission rate) in the communication, a particularly preferred development of the method according to the invention proposes that the data to be transmitted are also divided and different communication routes are used for different parts of the data to be transmitted. Thus, in this case, not only the data to be transmitted and the redundant data are divided and transmitted over different communication routes but also the data to be transmitted themselves are split and transmitted as part-data via different communication routes. By this means, the speed of the transmission can be increased overall because the data to be transmitted are divided and transmitted in parallel. The redundant data are then generated additionally as already described and also transmitted via the communication routes.

A concrete option for generating redundant data consists for this embodiment in that these redundant data are formed by a logical operation on the or all different parts (part-data) of the data to be transmitted. For example, a bit-related XOR operation on a part or all of the various part-data of the data to be transmitted can be carried out, wherein, according to the invention, the "0" or "1" result of the operation can depend on whether an even or odd number of "0" or "1" entries is present in the various part-data, taken into consideration, at the respective bit position.

If this XOR operation is applied simultaneously to all different parts (part-data) of the data to be transmitted, a reconstruction of the lost data can be achieved at least in the case of a loss of only one communication link. It is particularly advantageous, however, when the number of the various parts (part-data) which are intended to be reconstructable by redundant data can be predetermined. In this case, it is also possible to select a part-selection from the total number of different parts (part-data) and in each case to form redundant data for these various parts of the data to be transmitted. A reconstruction of the data can then still be achieved even in the case of the failure of a number of communication routes.

In the following, this will be explained with reference to an example. If, for example, three communication routes are available and thus three different parts of the data to be transmitted (part-data) are formed, it can be predetermined that redundant data are generated between the first and the second, further redundant data are generated between the second and the third and further redundant data are generated between the third and the first part of the part-data. These redundant data are then distributed with the data to be transmitted in a suitable manner to the available communication routes so that in the case of a failure of also two communication links, a reconstruction of the data is possible overall.

Since the number of different parts (part-data) which is intended to be reconstructable by redundant data is predeterminable, the level of redundancy is thus adjusted, according to the invention. It applies that the redundancy achieved is all the greater the smaller the number (quantity) of the various parts (part-data) is which is intended to be reconstructable by redundant data. The greater the redundancy, however, the lower will be the data rate, i.e. the gain in time during the transmission by dividing the transmitted data themselves over a number of communication routes.

The various parts of the data to be transmitted and the redundant data are then distributed to the three, or more, generally available, communication routes by a suitable interleaving arrangement. According to an aspect of the invention, the selection of the level of redundancy can be predetermined individually for each node and thus also be different for different data and/or intermediate nodes.

In an actual example, the transmitting data node A is intended to exchange data with the receiving data node B. For this purpose, the transmitting data node A sends the data on three different communication routes to the receiving node B. Additionally, the redundant data are distributed to the three communication routes in such a manner that the total rate is twice that of the data rate of one communication route and not only corresponds to the simple data rate of one communication route as would be the case with identical data on the three communication routes according to the simplest embodiment of the case previously described.

According to the invention, a very good adjustment of the communication parameters of speed versus robustness can be balanced in this manner, where the adjustment can be predetermined differently for each participating data node or intermediate node in the network, for example on the basis of the frequency of disturbances occurring or by inputs adjustable by the user.

A particularly advantageous aspect of the proposed method provides that the data to be transmitted and the redundant data are transmitted in each case in data packets, the redundant data being formed in this case preferably from the data packets of the data to be transmitted. The data combined in the data packets represent bit sequences which are simple to handle so that the redundant data can be generated without great expenditure. In addition, the individual data packets of the data to be transmitted can be allocated simply to one communication route so that the redundant data generated from the data packets of the data to be transmitted can be distributed neatly to other communication routes in order to reliably achieve the desired redundancy.

It is also advantageous, in accordance with an aspect of the present invention, to perform the selection of the communication routes used statically and/or dynamically. The static selection of a communication route means that the routers or intermediate nodes, i.e. the receivers and transmitters for receiving and retransmitting data messages, are permanently predetermined. Since the position of the individual data and/ or intermediate nodes in the vehicle is preferably known, alternative routes can thus be selected which spatially exhibit different directions of propagation so that in the case of a temporary shielding of one communication route, the other communication route functions with a certain probability. As an alternative, the communication route can also be selected dynamically by means of criteria.

The advantage of a static communication route specification is that the routes have a maximum spatial separation and the resources of the individual network nodes can also be used in a balanced manner. The dynamic communication route specification, in contrast, has the advantage that relatively small disturbances of a communication route can be bypassed without a loss of redundancy. However, the dynamic route selection does not guarantee that the resources of the individual nodes (intermediate nodes) used for the routing or components with routing function, interposed in the communication path, are uniformly utilized. Dynamic routing can lead to load peaks of the individual nodes and thus delays of transmission.

For this reason, according to another aspect of the present invention, a variant is proposed preferably which is a combination of a static communication route specification with a restricted dynamic routing which, for example, is restricted by the fact that a dynamic selection of only predetermined nodes is allowed. By this means, small-scale disturbances can be bypassed while at the same time retaining a spatial separation of the various communication routes.

Especially within the context of a dynamic or partially dynamic selection of the communication routes used, it is advantageous if each node (data node, intermediate node or router) knows its position in the vehicle. This provides for a position-selective communication route selection by selection of the various nodes involved in the communication route.

Especially preferably, the wireless communication can be an ultra-wide-band communication (UWB communication) which is already very resistant due to its large frequency bandwidth and offers radio ranges typically needed in a vehicle. In this context, techniques already known can be used as a basis for setting up the network which manage with or without a master device for organizing the networks. These techniques are known, for example, through ZigBee, or WLAN (IEEE 802.11 family), WiMax, Bluetooth, etc.

According to an aspect, the present invention also relates to a system or to a device for transmitting data in a motor vehicle in which the transmission takes place by means of wireless communication. The system has a first transmitting data node and a second receiving data node and at least two different communication routes for transmitting data between the first and the second data node. For this purpose, intermediate nodes having a routing function are preferably provided which receive, and retransmit, the data emitted by the first data node so that the second data node (or a further intermediate node) can receive these data. The first data node and the second data node in each case have a computing unit that is configured to perform a transmission of data. This correspondingly applies also to the intermediate nodes.

According to another aspect of the invention, the computing unit of the first and the second data node and, if necessary, the computing units of the intermediate nodes, are configured to perform the method described above or parts thereof.

BRIEF DESCRIPTION OF THE DRAWINGS

Further advantages, features and possible applications of the present invention are found in the subsequent description of an exemplary embodiment, and the drawings. In this context, all features described and/or represented pictorially by themselves or in arbitrary combination form the subject matter of the present invention, also independently of their combination in the claims or their references.

In the figures.

DETAILED DESCRIPTION OF THE PRESENTLY PREFERRED EMBODIMENTS

Figure 1:
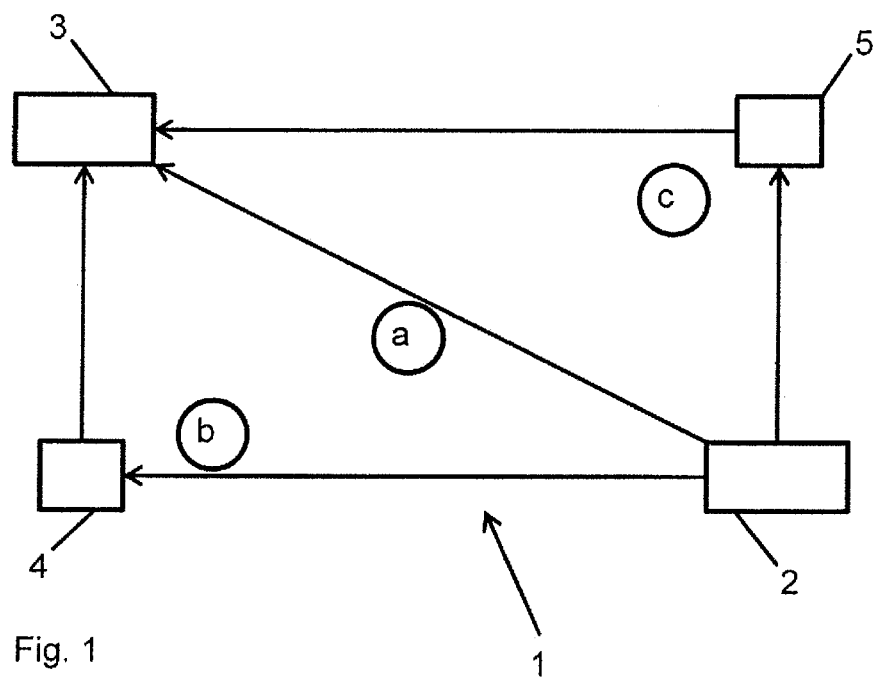
FIG. 1 shows diagrammatically a system according to the invention for transmitting data in a motor vehicle.

FIG. 1 shows diagrammatically a system or, respectively, a device 1, for the wireless transmission of data in a motor vehicle. The system 1 has a first transmitting data node 2 and a second receiving data node 3. The transmitting data node 2 can be, for example, a reversing camera, and the receiving data node 3 can be, for example, a head unit.

From the first data node 2 to the second data node 3, the data are transmitted via different communication routes a, b, c. The first communication route a provides a direct transmission from the first data node 2 to the second data node 3. The second communication node b transmits the data from the first data node 2 to an intermediate node 4, which transmits the data received from the first data node 2 as part of a router function so that the data can be received by the second data node 3. Analogously, a third communication route c, having an intermediate node 5, is provided.

The transmissions taking place in each case between nodes 2, 3, 4 and 5 are identified by arrows.

The first data node 2 and the second data node 3 have in each case a computing unit for performing a transmission of data which will be described more precisely in the text which follows. This correspondingly applies to the intermediate nodes 4 and 5 fulfilling a routing function, which also have in each case a computing unit. Furthermore, the data nodes are equipped in the required manner with a transmitter and/or receiver in order to be able to transmit and/or receive data. Neither the computing units nor the transmitters/receivers are shown in FIG. 1 for the sake of simplicity.

In the example shown in FIG. 1, the transmission takes place by means of an ultra-wide-band communication (UWB communication) which, due to a large frequency bandwidth, is quite resistant to disturbances of the frequency band and is particularly suitable for short range communication within a vehicle. However, the invention is not restricted to this type of communication and can be used, in particular, for all wireless communication systems. In principle, it would even be conceivable to use the system proposed according to the invention also in the context of a wire-connected communication even though the probability of failure of a communication path is much less with such wire-connected communication and the advantages of the present invention can, therefore, be used especially in conjunction with wireless communication.

The computing units used as part of the system 1 are configured for performing the method described in the text which follows in which the data are divided by the first transmitting data node 2 and, therefore, in this case three different communication routes a, b, c are transmitted to a second receiving data node 3 and are reassembled upon reception. The data which are transmitted overall are composed of data to be transmitted and redundant data which are generated from the data to be transmitted.

Figure 2:
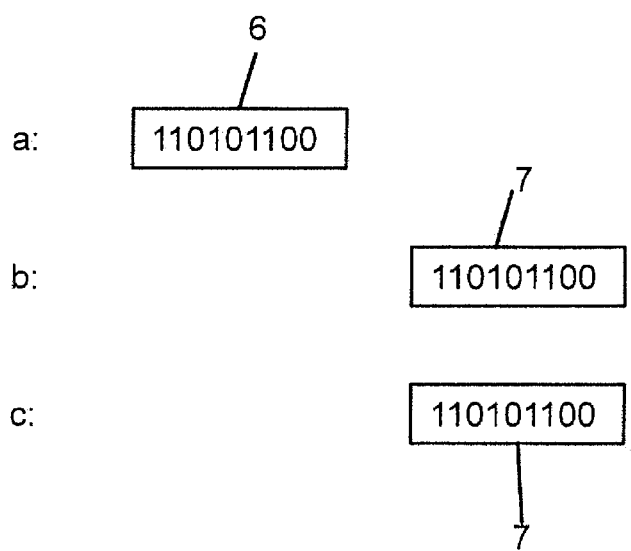
FIG. 2 shows diagrammatically the method for transmitting data via various communication routes according to a first embodiment.

This is shown in a simple example in FIG. 2. The redundant data 7 allow the data 6 to be transmitted to be reconstructed in the case of the failure of a communication route a, b, c and are transmitted jointly with the data 6 to be transmitted via the different communication routes a, b, c.

In FIG. 2, the various communication routes a, b, c are shown below one another. On communication route a, the data 6 to be transmitted are to be transmitted. These are combined to form a data packet and represent a bit sequence "110101100". In order to generate redundant data 7 from these data 6 to be transmitted, these data 6 to be transmitted are simply copied in the example shown so that the redundant data 7 in each case represent a copy of the data 6 to be transmitted. These redundant data 7 are transmitted in each case via communication routes b and c. The data transmission overall is thus divided over the available communication routes, a, b, c, the data 6 to be transmitted being transmitted via communication route a and the redundant data 7 being transmitted via communication routes b, c.

As shown diagrammatically in FIG. 1, communication routes a, b, c are spatially separate from one another, communication routes b, c being defined by the selection of certain intermediate nodes 4, 5 which are preferably defined statically or essentially statically with certain dynamic alternate options. In this manner, it is possible to select, apart from the direct communication route a, for example, a communication route b via the left-hand side of the vehicle and a communication route c via the right-hand side of the vehicle.

This has the advantage that even in the case of a shielding produced by additional loading, of one of the communication routes a, b, c, a reliable transmission of the data takes place since either the data 6 to be transmitted or a copy of these data 6 to be transmitted reach, as redundant data 7, the second receiving data node 3, which reassembles the data transmitted divided via the various communication routes a, b, c. In this simple example according to FIG. 2, the assembling of the data consists simply of the selection of the data transmitted to a communication route a, b or c.

In this example, a redundancy of the data is generated since a complete reconstruction of the data is possible even if only one of the three communication routes a, b, c is working. In this case, therefore, the method according to the invention creates a dual redundancy, a possible gain in time not being realized in the transmission by utilizing three parallel communication routes a, b, c.

In order to additionally utilize the increase in capacity created by the creation of parallel communication routes a, b, c in the transmission and achieving a faster transmission of the data 6 to be transmitted overall, it can be provided in accordance with another example of the present invention to split the data 6 to be transmitted themselves and transmit them via different communication routes a, b, c.

Figure 3:
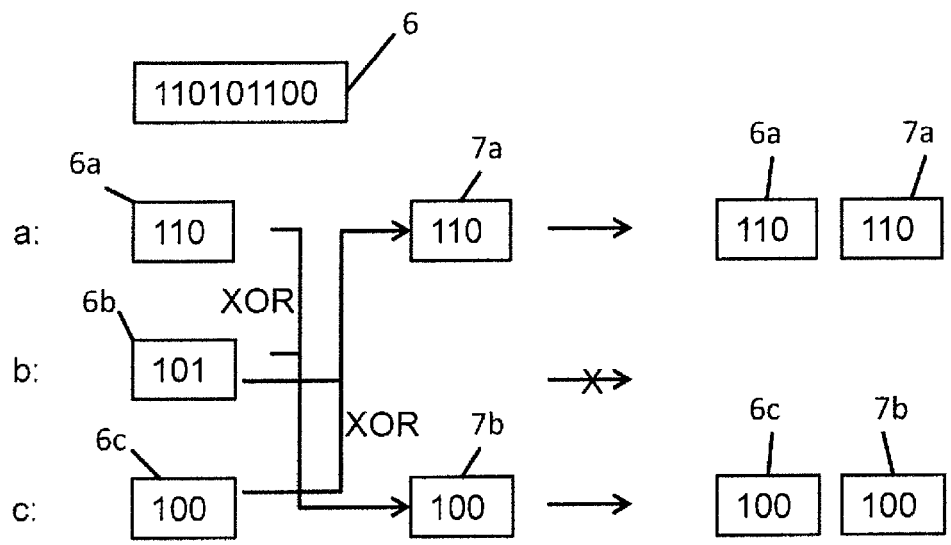
FIG. 3 shows diagrammatically the method for transmitting data via different communication routes according to a second embodiment.

This is shown by way of example in FIG. 3. The bit sequence of the data 6 to be transmitted there is disassembled into packets of part-data 6a, 6b, 6c to be transmitted, three successive bits of the bit sequence being combined in each case to form one part-data packet 6a, 6b, 6c. These part data 6a, 6b, 6c are transmitted via the different communication routes a, b, c in such a manner that the part-data 6a are transmitted via communication route a, the part-data 6b are transmitted via communication route b and the part-data 6c are transmitted via communication route c. This can be done, for example, in the form of data packets.

To generate the redundant data, in each case redundant data of two of the total of three part-data 6a, 6b, and 6b 6c, respectively, are formed by an "XOR" operation on these part data in which it is checked bit by bit whether an even number or odd number of "1" entries is present at one point of all part-data 6a, 6b, taken into consideration in the formation of the redundant data, for the redundant data 7a and 6b, 6c, respectively, for the redundant data 7b. In the case of an even number which also includes the number zero of bit values "1", the bit value "1" is assigned in the redundant data at the corresponding bit position of the redundant data 7a, 7b. In the case of an odd number of bit values "1" in the part-data 6a, 6b and 6b, 6c, respectively, considered, the bit value "0" is generated in the redundant data 7a, 7b. This is shown in FIG. 3.

Following this, the part-data 6a, 6b, 6c to be transmitted and the redundant data 7a, 7b are transmitted divided over the communication routes a, b, c, interleaving being carried out in as much as the redundant data 7a for the part-data 6a, 6b to be transmitted are transmitted on the communication route c remaining in each case and the redundant data 7b for the part-data 6b, 6c to be transmitted are transmitted on communication route a. This enables the data to be restored overall in the case of a failure of one of the communication routes a, b, c.

Figure 4:
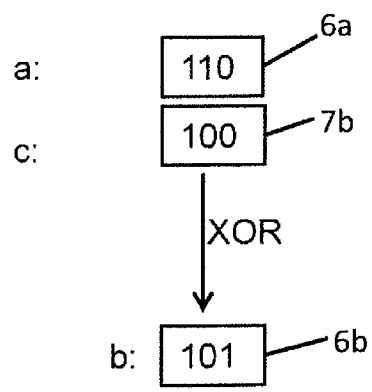
FIG. 4 shows diagrammatically the reconstruction of data lost on a communication route according to FIG. 3.

This reconstruction is explained in FIG. 4 for the case indicated in FIG. 3 that communication route b is disturbed.

In this case, the receiving data node 3 cannot generate the center part of the data 6 to be transmitted directly by assembling the part-data 6a, 6b, 6c transmitted via communication routes a, b, c because the part-data 6b are not present at the receiving data node 3. In this case, however, the lost part-data 6b can be reconstructed by the part-data 6a received via communication route a and the redundant data 7b received via communication route c.

For this purpose, the same "XOR" operation is applied to the part-data 6a and the redundant data 7b. This results in the part-data packet "101" shown in FIG. 4 which corresponds to the part-data packet 6b of the divided or split data 6 to be transmitted.

This shall be explained again bit by bit in the text which follows. At the first bit position, the part-data 6a and the redundant data 7b have in each case the value "1" so that an even number of values "1" is present and the reconstructed bit value at the first bit position is also "1". At the second bit position, an odd number of bit values "1" is present so that the reconstructed bit value is "0". At the third position, there is no bit value "1" at all which is equal to an even number of "1" bit values and which leads to the entry "1". This results in the reconstruction of bit sequence "101" which corresponds to the part-data 6b to be transmitted. After this reconstruction, all part-data 6a, 6b, 6c are then present in the receiving data node 3 so that the data 6 to be transmitted can be reconstructed again in it.

According to the invention, the weighting between achievable redundancy and transmission rate can be adapted depending on the specified degree of redundancy.

Another exemplary distribution of the part-data and the redundant data to the different communication link utilizes a different sequence in time. For this purpose, the data are divided into packets (for example D1-D6). In the first time increment, the data packet D1 is then transmitted via communication route a, data packet D2 via communication route b and a redundant information item DR12 via communication route c. The redundant information item DR12 is here the bit by bit XOR operation on D1 and D2. In the next time increment, the data packet D3 is transmitted via communication route a, the redundant information item DR34 via communication route b and the data packet D4 via communication route c. The redundant information item DR34 is again the bit-by-bit XOR operation of D3 and D4. In the next time increment, the redundant information item DR56 is transmitted via communication route a, the data packet D5 via communication route b and the data packet D6 via communication route c, DR56 being the bit-by-bit XOR operation of D5 and D6. In the next time increment, the transmitting pattern begins again from the start.

In this transmitting pattern, data are therefore first transmitted on communication routes a and b and redundant information on communication route c in a temporal sequence. In the next transmitting time increment, data follow on communication routes a and c and redundant information on communication route b. In the next transmitting time increment, data follow on communication routes b and c and redundant information items on communication route a.

If one of the communication routes fails in this transmitting pattern, either all data are received in any case in every time increment (because the redundant channel is missing) or the missing data packet can be reconstructed via the received data packet and the received redundant data.

Of particular advantage when using the method according to the invention in wireless communication in a vehicle, is the lack of plugs at the components, apart from the necessary power supply, and thus of a large cost and installation space factor. The cables saved also mean a great saving in weight and, therefore, contribute to advantageous consumption values. In addition, further communication partners can be integrated in a simple manner in the communication network and a large number of component configurations can be covered. In addition, gateways can be saved since the wireless interface acts as a virtual gateway.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for transmitting data in a motor vehicle by wireless communication over a network having a plurality of nodes, the method comprising:

dividing data from a first transmitting data node (2);

transmitting, via at least two different communication routes (a, b, c), the divided data to a second receiving data node (3);

reassembling, upon reception, the transmitted divided data;

generating, of data (6, 6a, 6b, 6c) to be transmitted, redundant data (7, 7a, 7b) which facilitate reconstruction of the data (6, 6a, 6b, 6c) to be transmitted in the case of a failure of a communication route (a, b, c); and transmitting the redundant data (7, 7a, 7b) and the data (6, 6a, 6b, 6c) to be transmitted via the different communication routes, wherein:

selection of the communication routes is carried out by a combination of:
(a) static route selection, and
(b) restricted dynamic route selection, in which dynamic selection of only a predetermined number of the data nodes is permitted, each of the plurality of nodes is aware of its position within the motor vehicle, and the redundant data (7a, 7b) are formed by a logical operation on different parts of the data (6a, 6b, 6c) to be transmitted, weighting between achievable redundancy and transmission speed being adapted by specifying the degree of redundancy.

2. The method as claimed in claim 1, wherein the redundant data (7) are a copy of the data (6) to be transmitted and the redundant data (7) and the data (6) to be transmitted are transmitted via different communication routes (a, b, c).

3. The method as claimed in claim 1, wherein the data (6a, 6b, 6c) to be transmitted are divided and different communication routes (a, b, c) are used for different parts of the data (6a, 6b, 6c) to be transmitted.

4. The method as claimed in claim 3, wherein the number of different parts of the data (6a, 6b, 6c) reconstructable by the redundant data (7a, 7b) is a predeterminable number.

5. The method as claimed in claim 1, wherein the data (6, 6a, 6b, 6c) to be transmitted and the redundant data (7, 7a, 7b) are transmitted in each case in data packets, the redundant data (7, 7a, 7b) being formed from the data packets of the data (6, 6a, 6b, 6c) to be transmitted.

6. The method as claimed in claim 1, wherein the wireless communication is an ultra-wide-band communication.

7. A system for transmitting data in a motor vehicle by wireless communication over a network having a plurality of nodes, comprising a first transmitting data node (2) and a second receiving data node (3) and at least two different communication routes (a, b, c) for transmitting data between the first and the second data node (2, 3), the first data node (2) and the second data node (3) in each case having a computing unit configured for performing a transmission of data, wherein the computing unit of the first data node (2) and the computing unit of the second data node (3) is configured to perform the method as claimed in claim 1.

* * * * *